United States Patent
Grose et al.

(10) Patent No.: US 7,541,083 B2
(45) Date of Patent: Jun. 2, 2009

(54) JOINING STRUCTURES

(75) Inventors: Douglas L. Grose, Auburn, WA (US); Steven P. Wanthal, St Charles, MO (US); Joseph L. Sweetin, Lake Forest Park, WA (US); Christopher B. Mathiesen, St Charles, MO (US); Randy A. Southmayd, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/126,649

(22) Filed: May 23, 2008

(65) Prior Publication Data

US 2008/0226869 A1 Sep. 18, 2008

Related U.S. Application Data

(62) Division of application No. 11/137,222, filed on May 25, 2005, now Pat. No. 7,393,488.

(51) Int. Cl.
*B32B 7/04* (2006.01)
(52) U.S. Cl. .................. 428/119; 428/122; 244/131
(58) Field of Classification Search ................ 428/119, 428/120, 122; 244/131; 403/265
See application file for complete search history.

(56) References Cited

U.S. PATENT DOCUMENTS

| 2,521,463 | A | 9/1950 | Kircher |
| 3,167,823 | A | 2/1965 | Palfey |
| 5,778,571 | A | 7/1998 | Pasqualini et al. |
| 6,374,570 | B1 | 4/2002 | McKague, Jr. |
| 2004/0011927 | A1 * | 1/2004 | Christman et al. .......... 244/131 |

FOREIGN PATENT DOCUMENTS

| DE | 4202391 A1 | 8/1993 |
| EP | 1520895 A1 | 4/2005 |
| GB | 656541 | 8/1951 |

* cited by examiner

*Primary Examiner*—Alexander Thomas
(74) *Attorney, Agent, or Firm*—Lee & Hayes, PLLC

(57) ABSTRACT

A product including a first structure. A joint element is attached to the first structure. The joint element has a base and at least two legs extending from the base, the legs defining a slot having opposing sides and a bottom. A second structure is positioned in the slot. An adhesive is disposed in the slot joining the second structure to the joint element. A cavity is formed between the bottom of the slot and the second structure. The cavity being substantially free of adhesive.

9 Claims, 9 Drawing Sheets

JOINING STRUCTURES

CROSS REFERENCE TO RELATED APPLICATIONS

This patent application is a division of prior U.S. application Ser. No. 11/137,222, filed May 25, 2005 (now U.S. Pat. No. 7,393,488), which application is incorporated herein by reference.

STATEMENT REGARDING FEDERALLY SPONSORED RESEARCH OR DEVELOPMENT

This invention was made with government support under a grant from the U.S. Air Force (F33615-48-3-5103). The U.S. government has certain rights in this invention.

BACKGROUND OF THE INVENTION

The present invention relates to a method of joining structures, and specifically a method of joining two structures using an adhesively bonded joint.

A common method for connecting structures is by mechanical fastening. Mechanical fastening includes connecting a first structure 10 to a second structure 12 directly using mechanical fasteners 14, as shown in FIG. 1, or connecting the first structure 10 to a second structure 16 indirectly by way of one or more intermediate components 18 and mechanical fasteners 14, as shown in FIG. 2. Although mechanical fastening is often acceptable in terms of cost, weight, complexity and strength, fastening methods having still lower costs, complexity, and weight, without compromising strength, are always desired.

One substitute for mechanical fastening is adhesive bonding. FIG. 3 shows a traditional adhesive joint, generally designated by reference number 30, including a double lap joint element 32 (also referred to as a clevis or "pi" joint element) having a slot 34. The joint element 32 is connected to a first structure 36 and bonded to the second structure 38 by an adhesive 40. A plug or nugget 42 of adhesive fills a bottom 44 of the slot 34. Fastening by adhesive bonding is generally less costly than mechanical fastening because it does not require formation of holes usually required for mechanical fastening.

Although adhesively bonded joints are not necessarily lighter than mechanically fastened joints, in many cases they are. This difference often results from the difference in materials required to form the joints. Another reason for weight difference results from differences in the structures being joined. Allowable structural dimensions often depend on the type of joint used. For example, although strength requirements of a first structure having holes for mechanical fastening may mandate a certain thickness of the first structure, the same requirements may allow a smaller thickness when no holes are present.

Although adhesive bonding is generally simpler and less costly compared to conventional mechanical fastening, loss of structural integrity has been linked to the presence of nuggets 42 in the bottom 44 of the slot 34. Specifically, most adhesives 40 experience some degree of relative contraction with respect to the joint element 32 and second structure 38 during curing. Also, because adhesives 40 generally have a coefficient of thermal expansion greater than that of the joint element 32 and second structure 38, the adhesive expands and contracts with respect to the joint element and second structure during thermal cycling (exposure to relatively high and relatively low temperatures).

BRIEF SUMMARY OF THE INVENTION

The present invention relates to a method of joining a first structure to a second structure using a joint element. The joint element has a base and at least two legs extending from the base and the legs define a slot having opposing sides and a bottom. The method comprises attaching the joint element to the first structure and inserting the second structure into the slot. The method further includes injecting an adhesive into the slot. The method also includes ensuring a cavity is formed between the bottom of the slot and the second structure and the cavity is substantially free of adhesive.

In another aspect, the present invention includes a product of manufacture comprising a first structure and a joint element attached to the first structure. The joint element has a base and at least two legs extending from the base and the legs define a slot between having opposing sides and a bottom. The product further comprises a second structure positioned in the slot and an adhesive disposed in the slot joining the second structure to the joint element. The product also comprises a cavity formed between the bottom of the slot and the second structure, said cavity being substantially free of adhesive.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
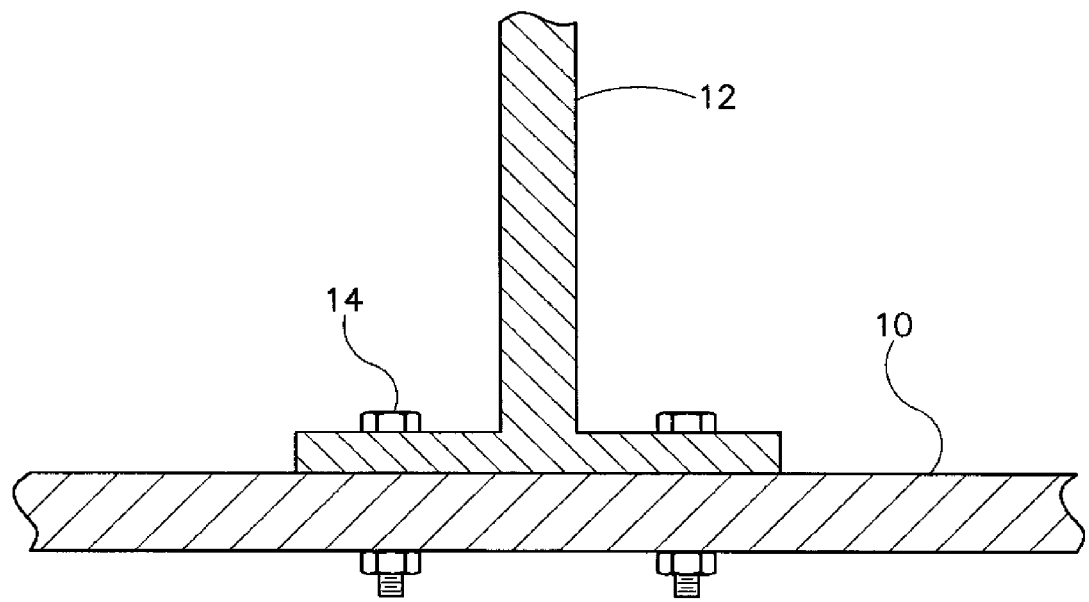
FIG. 1 is a cross-sectional elevation of a mechanical joint according to the prior art.
Figure 2:
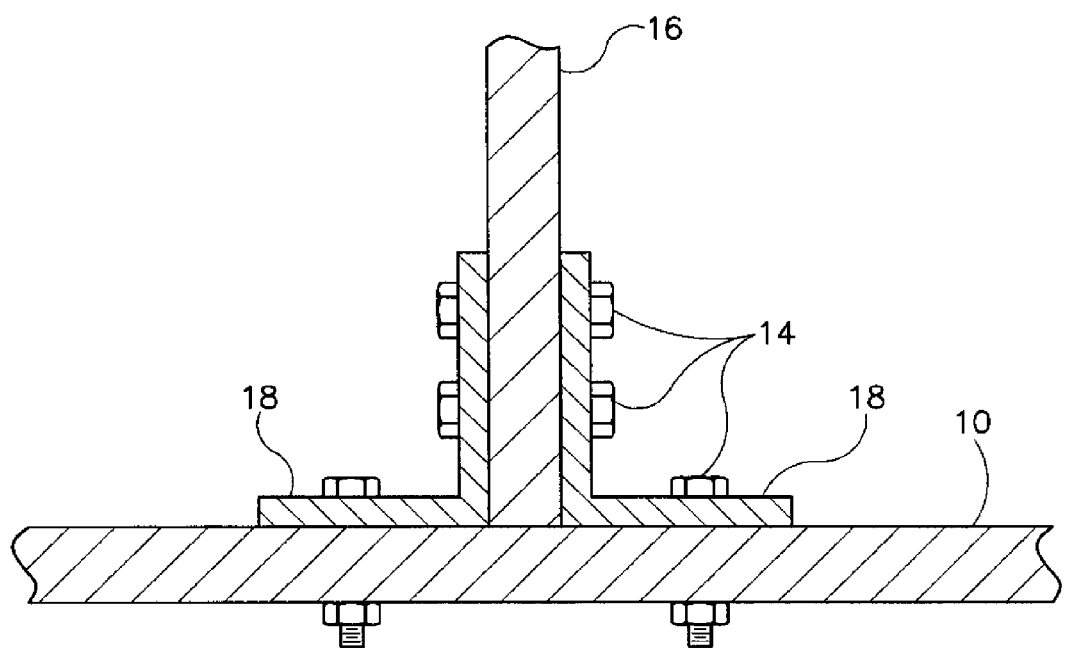
FIG. 2 is a cross-sectional elevation of another mechanical joint according to the prior art.
Figure 3:
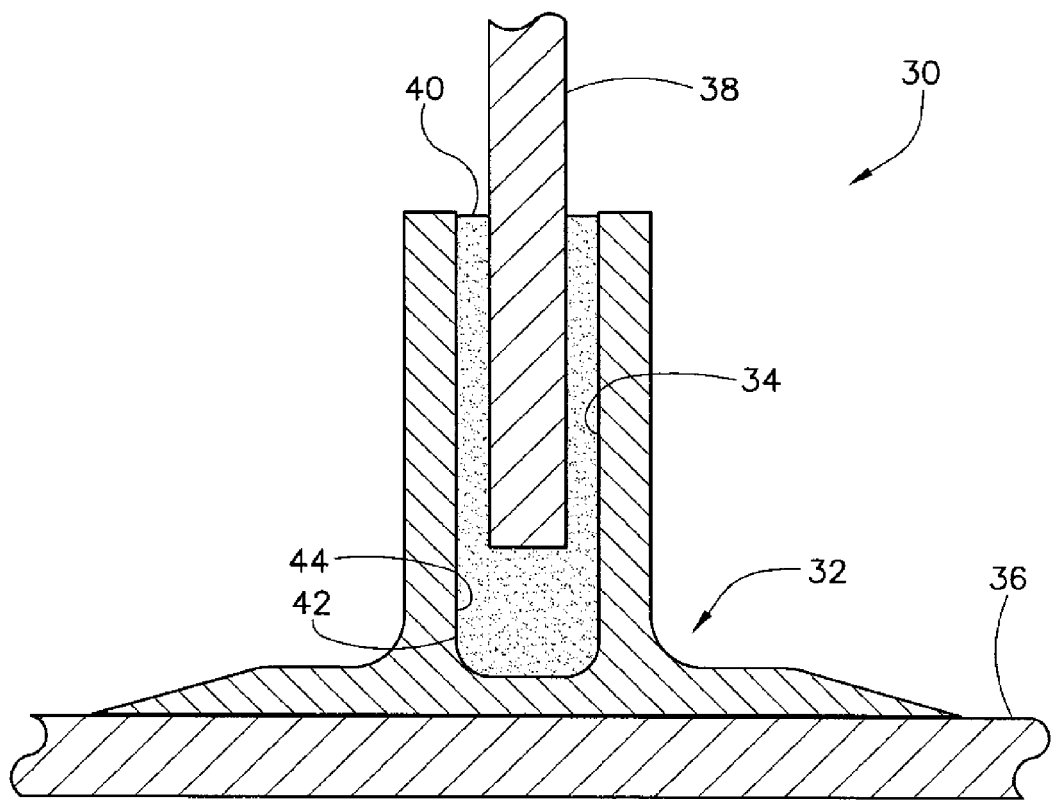
FIG. 3 is a cross-sectional elevation of an adhesively bonded joint according to the prior art.
Figure 4:
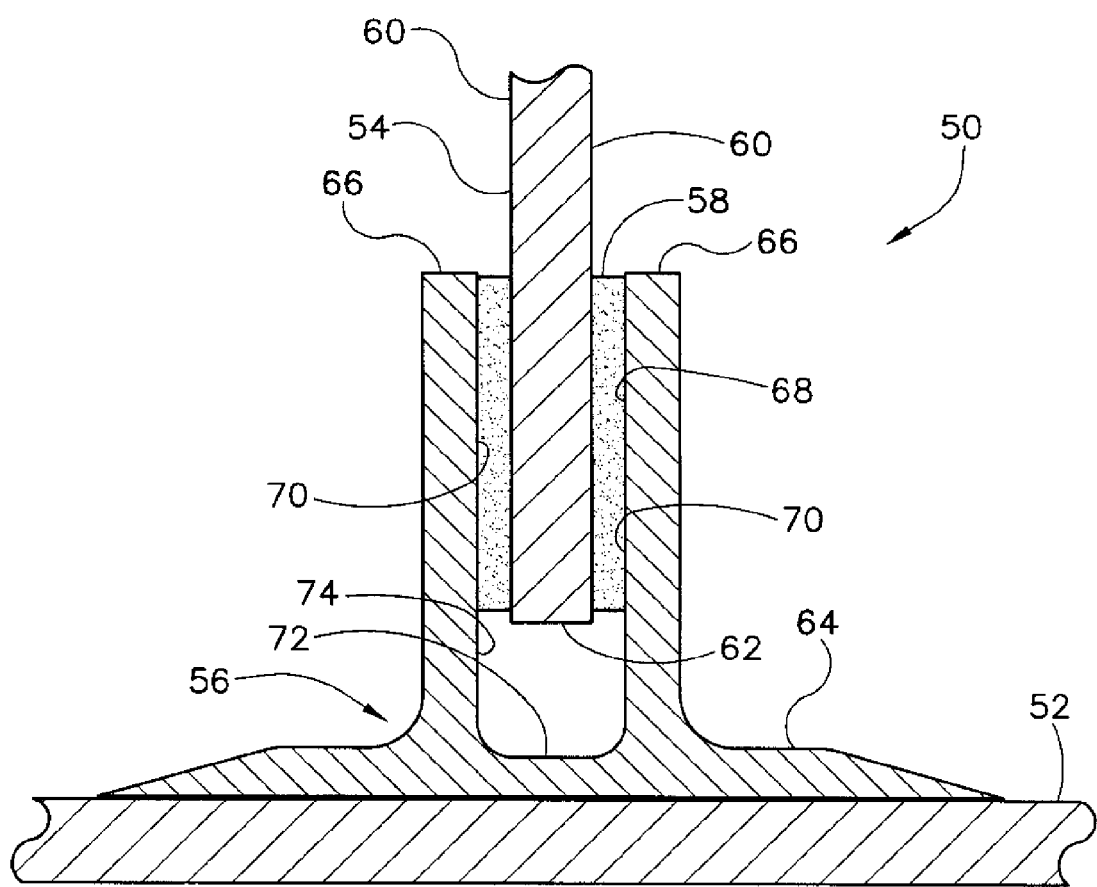
FIG. 4 is a cross-sectional elevation of a first embodiment of an adhesively bonded joint according to the present invention.

The present invention relates to a method of joining two or more structures, and more particularly to a method of joining two structures using an adhesively bonded joint having a cavity that is substantially free of adhesive. Referring now to the figures, and more particularly to FIG. 4, a joint according to a first embodiment of the present invention is designated in its entirety by reference number 50. The joint 50 connects a first structure 52 to a second structure 54 using a joint element 56 and an adhesive 58. The second structure 54 has faces 60 and a lower surface 62. The joint element 56 has a base 64 and two legs 66 extending from the base. The legs 66 define a slot 68 having opposing sides 70 and a bottom 72.

The bottom 72 of the slot 68, the sides 70 of the slot, the adhesive 58, and the lower surface 62 of the second structure 54 define a cavity 74 that is substantially free of adhesive 58. The cavity 74 can be kept free of adhesive 58 in a variety of ways. The ways of keeping the cavity 74 free of adhesive 58 can be separated into two categories: impeding flow of the adhesive into the cavity during injection of the adhesive into the slot 68 and removing adhesive from the cavity during and/or after injection of the adhesive into the slot. The adhesive 58 may be injected into the slot 68 before, during, and/or after the second structure 54 is inserted into the slot.

A variety of materials can be used as the adhesive 58 and the joint element 56, as will be appreciated by those skilled in the art. Although other adhesives 58 may be used without departing from the scope of the present invention, in one embodiment the adhesive is EA 9394, available from Loctite of Rocky Hill, Conn. In one embodiment, the adhesive 58 used has a coefficient of thermal expansion of between about $20 \times 10^{-6}$ in./in.-degree. F. and about $45 \times 10^{-6}$ in./in.-degree. F. Although the joint element 56 may comprise other materials without departing from the scope of the present invention, in one embodiment the joint element comprises steel. Other possible joint element 56 materials include other metals, ceramics, cement, and composites, such as a fiberglass epoxy. The joint element 56 may also include a laminate.

Figure 5A:
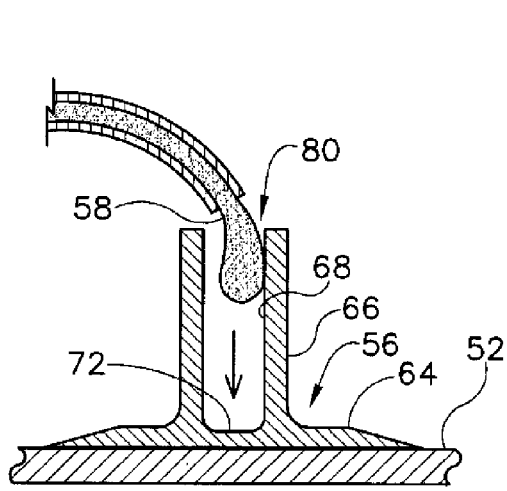
FIGS. 5A-5F are cross-sectional elevations showing a method of making the first embodiment of an adhesively bonded joint according to the present invention.
Figure 5B:
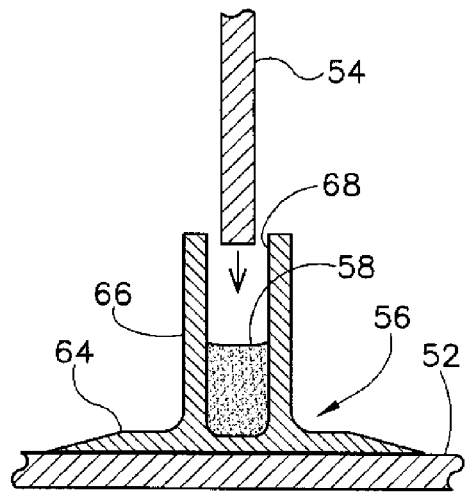
Figure 5C:
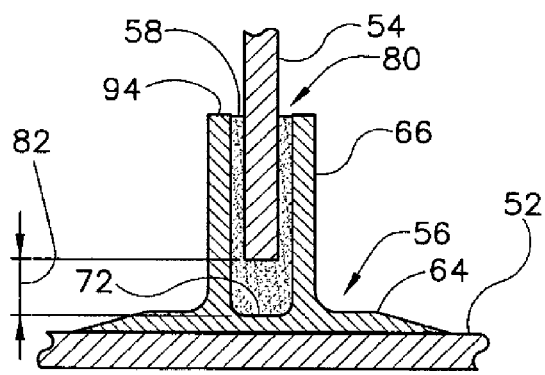
Figure 5D:
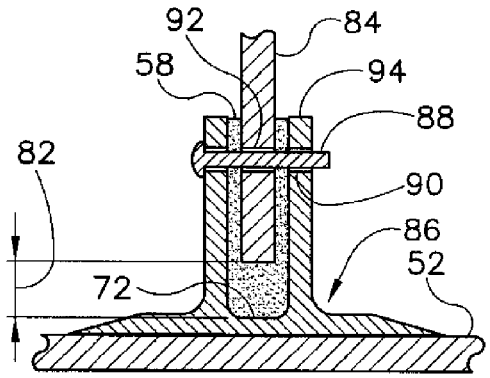
Figure 5E:
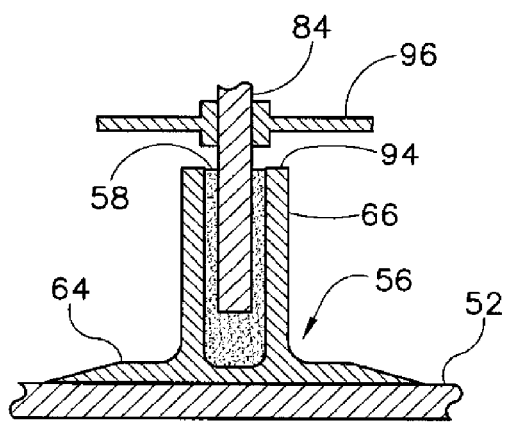

FIGS. 5A-5F show an embodiment in which the adhesive 58 is injected into the slot 68 of the joint element 56 before the second structure 54 is introduced into the slot. The adhesive 58 may be injected into the slot 68 through a top opening 80 of the slot, as shown in FIG. 5A. Adhesive 58 may also be injected into the slot 68 adjacent the bottom 72 of the slot. For example, adhesive 58 can be injected into the slot 68 by way of a feed hole (not shown) formed in one or more of the joint element legs 66. After the joint element 56 is filled at least part way with adhesive 58, the second structure 54 is plunged into the slot 68, as shown in FIGS. 5B and 5C. Any excess adhesive 58 overflowing above the top opening 80 of the slot 68 as a result of being displaced by the second structure 54 may be wiped away or otherwise removed. The second structure 54 is spaced from the bottom 72 of the slot 68 by a predetermined distance 82. Presence of the desired distance 82 can be ensured in a variety of ways. In one embodiment, presence of the predetermined distance 82 is ensured by fastening a second structure 84 to a joint element 86. For example, a fastener 88 can be placed through an index hole 90 in the joint element 86 and an index hole 92 in the second structure 84, as shown in FIG. 5D. In another embodiment (not shown), index holes in the legs of the joint element are not required. For example, it is envisioned that the fastener 88 may be positioned within the second structure 84 so the fastener rests on a top 94 of the joint legs 66 when the second structure is in the desired position. As another example, it is envisioned that the second structure 54 may include one or more protrusions (not shown) that sit on the top 94 of the joint legs 66 when the second structure is lowered into place. In one embodiment, a machine 96 lowers the second structure 54 to a desired position and suspends it there until the adhesive 58 cures sufficiently to hold the second structure in the desired position, as shown in FIG. 5E. In this embodiment, no index holes 90, 92 are needed.

Figure 5F:
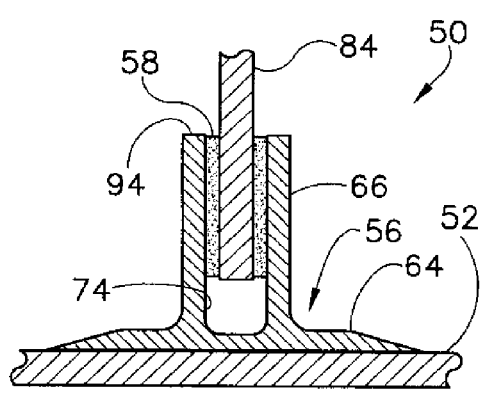

After the second structure 54 has been positioned as desired, the adhesive 58 positioned within the cavity 74 is removed so the cavity is substantially free of adhesive, as shown in FIG. 5F. The adhesive may be removed in a variety of ways. For example, the adhesive 58 may be drilled or suctioned out. In one embodiment a brush (not shown) is pushed through the cavity while or soon after the adhesive 58 is injected. The drilling, suctioning, and brushing may be performed before the adhesive 58 is fully cured, which is especially helpful when the adhesive has a long curing time. As will be appreciated by those skilled in the art, each removal method may require the presence of a vent (not shown) to allow air to enter or leave the cavity 74 to avoid a vacuum or high pressure condition, as the case may be. For example, a vent can include a small hole (not shown) drilled through one of the joint element legs 66.

In one embodiment, the second structure 54 is inserted into the slot 68 of the joint element 56 before the adhesive 58 is injected into the slot. The second structure 54 may be positioned in the slot 68 in a variety of ways as described above. For example, the second structure 54 can be positioned using a fastener and index holes or a machine capable of precision positioning. After the second structure 54 is positioned as desired, the adhesive 58 is injected into the slot 68. The adhesive 58 may be injected into the slot 68 in a variety of ways as described above. For example, the adhesive 58 can be injected through a top opening 80 of the slot 68 or through a hole (not shown) in the joint element leg 66. After or while the adhesive 58 is injected, the adhesive is removed from the cavity 74 of the slot 68. The adhesive 58 may be removed from the cavity 74 in a variety of ways as described above. For example, the adhesive 58 can be drilled, vacuumed, or brushed from the cavity 74.

Figure 6A:
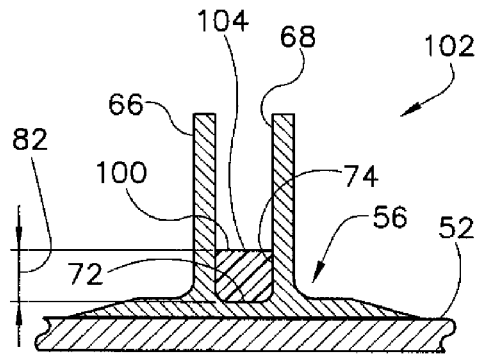
FIGS. 6A-6E are cross-sectional elevations showing a method of making a second embodiment of an adhesively bonded joint according to the present invention.

In another embodiment, the cavity 74 is kept substantially free of adhesive 58 by positioning a core 100 in the cavity before the injecting step so adhesive cannot be injected there. In one embodiment, the core 100 is a foam that is placed or injected into the slot 68 of a joint 102, as shown in FIG. 6A. In one embodiment, the foam core 100 is injected in a precise amount that will allow the second structure 54 to be spaced from the bottom 72 of the slot 68 by the predetermined distance 82 when placed on the foam core. Having the core 100 positioned in the cavity 74 has the additional benefit of creating a seal against moisture entering the cavity. Although other foams may be used as the core 100 without departing from the scope of the present invention, in one embodiment the foam is polysulfide foam having a low modulus of elasticity. A modulus below about $0.06 \times 10^6$ psi is considered low, compared to the moduli of materials such as aluminum, which has a modulus of about $10 \times 10^6$ psi, steel, which has a modulus of about $30 \times 10^6$ psi, and carbon fiber reinforced plastic, which has a modulus of about $7 \times 10^6$ psi. It is important to use a low modulus foam to avoid cracks or spaces in the joint 102 during thermal cycling. In one embodiment, it is preferred that the core 100 be electrically conductive. A conductive core will promote transfer of electricity through the joint 102 when, for example, the first structure 52 or second structure 54 become electrically charged. For example, if lightening strikes the first structure 52, it may be beneficial to have the charge induced by the lightening transferred through to the second structure 54 by way of a designed path (i.e., a path including the core). Otherwise, the charge may take other paths, such as sparking across a space, which may cause increased damage and possibly a fire or explosion if near fuel. Alternatively, it is envisioned that the core 100 may be a non-conducting material to electrically insulate the first structure 52 from the second structure 54.

Figure 6B:
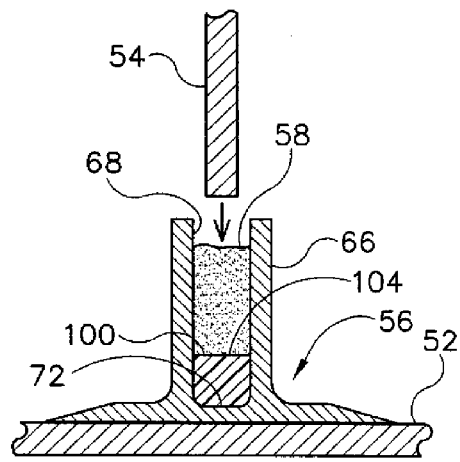
Figure 6C:
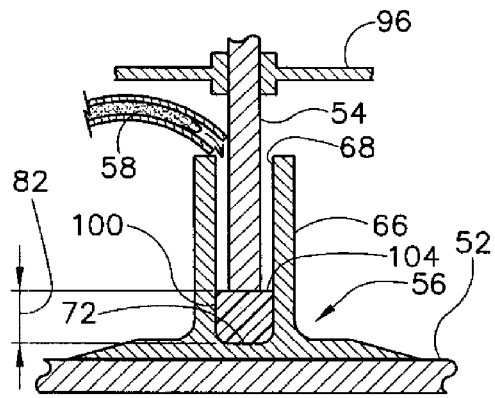
Figure 6D:
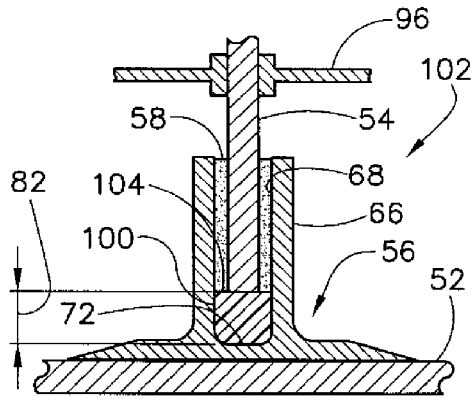
Figure 6E:
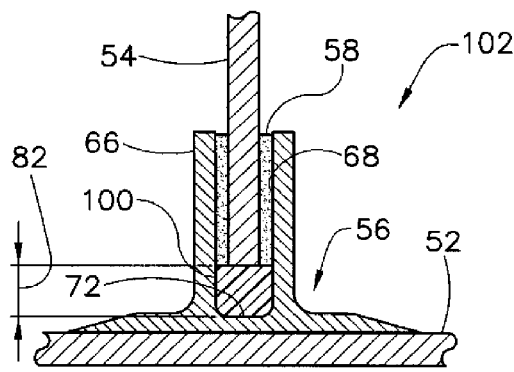

After the foam core 100 is positioned in the cavity 74, the second structure 54 and adhesive 58 are placed in the slot 68. The second structure 54 and adhesive 58 may be placed in the slot 68 in a variety of ways, including those described above. For example, the adhesive 58 may be injected into the slot 68 first, followed by insertion of the second structure 54, as shown in FIG. 6B. As another way of placing the second structure 54 and adhesive 58 in the slot 68, the second structure 54 may be positioned in the slot first, followed by injection of the adhesive 58, as shown in FIG. 6C. The foam core 100 keeps the adhesive 58 from entering the cavity 74. In one embodiment, the adhesive 58 fills substantially all of the slot 68 not occupied by the second structure 54 except the cavity 74. The depth of the slot 68 to which the second structure 54 is inserted can be controlled in a variety of ways, such as those already described. In the embodiments shown in FIGS. 6B and 6C, a placement machine 96 is used to precisely place the second structure 54 in the desired location and suspend it in place (as shown in FIG. 6D) until the adhesive 58 can fully support the second structure, as shown in FIG. 6E. In another embodiment, it is envisioned that the second structure 54 may be positioned in the slot 68 by placing a predetermined amount of foam in the cavity 74 so the second structure is properly positioned in the slot when it is placed on a top 104 of the foam when a surface tension of the foam is sufficient to completely support the second structure. It is also envisioned that the foam core 100 may be removed after the adhesive 58 is cured to produce a structure having a hollow cavity 74 (e.g., see FIG. 5F).

Figure 7A:
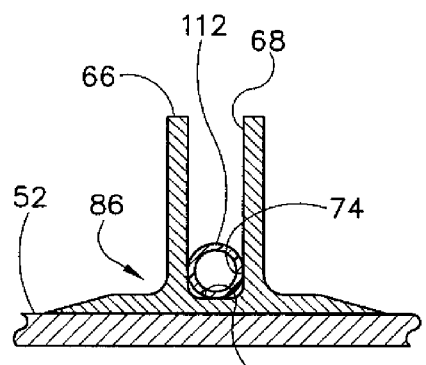
FIGS. 7A-7D are cross-sectional elevations showing a method of making a third embodiment of an adhesively bonded joint according to the present invention.
Figure 7B:
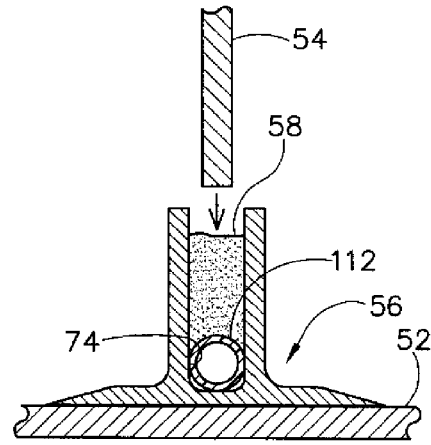
Figure 7C:
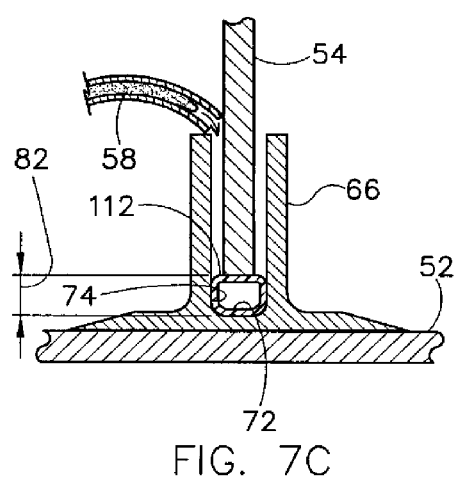
Figure 7D:
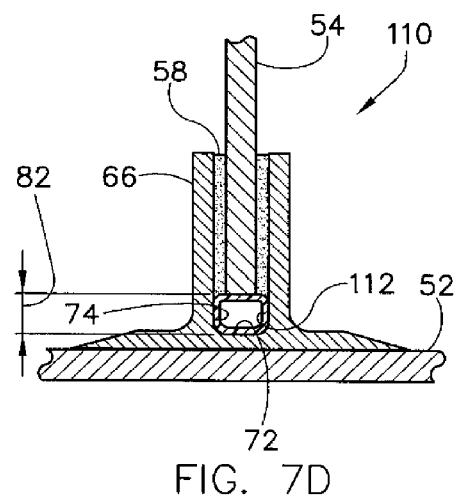

FIGS. 7A-7D show another embodiment that ensures the cavity 74 of a joint 110 is remains substantially free of adhesive 58 by using a core 112 that is a flexible tube. The flexible tube core 112 is placed in the cavity 74 before adhesive 58 is injected into the slot 68, as shown in FIG. 7A. Although the flexible tube core 112 may be made of other materials without departing from the scope of the present invention, in one embodiment the tube is made of polysulfide. The second structure 54 and adhesive 58 may be placed in the slot 68 in a variety of ways, such as those already described. For example, the adhesive 68 may be injected into the slot 68 first, followed by insertion of the second structure 54 into the slot, as shown in FIG. 7B. As another way of placing the second structure 54 and adhesive 58 in the slot 68, the second structure may be positioned in the slot first, followed by the injection of adhesive, as shown in FIG. 7C. The flexible tube core 112 keeps the adhesive 58 from entering the cavity 74. In one embodiment, the adhesive 58 fills substantially all of the slot 68 not occupied by the second structure 54 except the cavity 74. A predetermined distance 82 between the second structure 54 and the bottom 72 of the slot 68 can be ensured in a variety of ways as described above. For example, in one embodiment, the presence of the distance 82 is ensured by lowering the second structure 54 into the desired place using the precision placement machine 96 (shown in FIGS. 5E, 6C, and 6D). In another embodiment, the presence of the distance 82 is ensured by inserting a fastener through index holes in the joint element and second structure, respectively (e.g., see FIG. 5D).

Figure 8A:
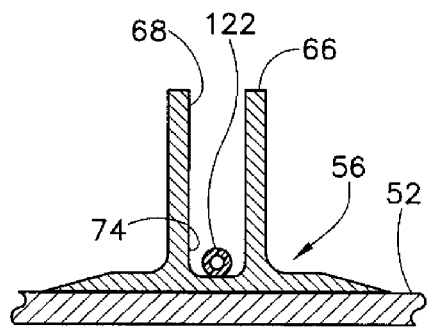
FIGS. 8A-8E are cross-sectional elevations showing another method of making the first embodiment of an adhesively bonded joint according to the present invention.
Figure 8B:
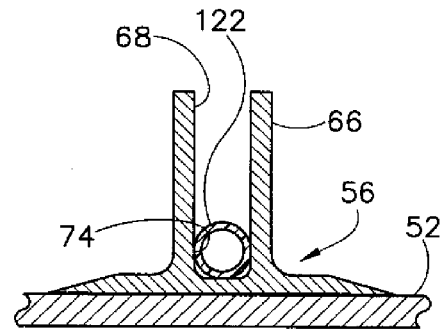
Figure 8C:
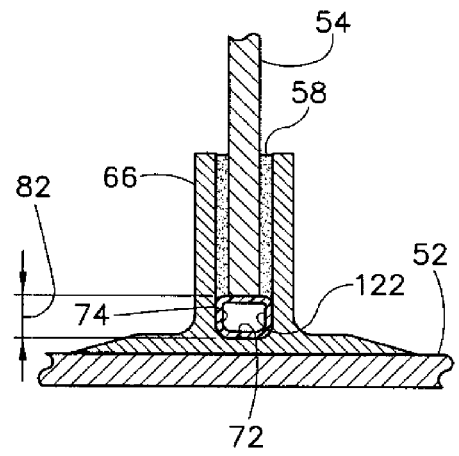
Figure 8D:
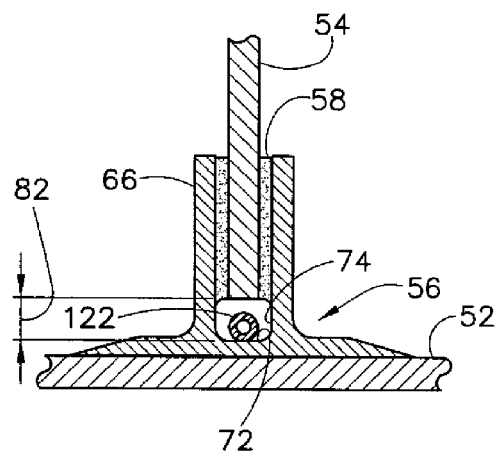
Figure 8E:
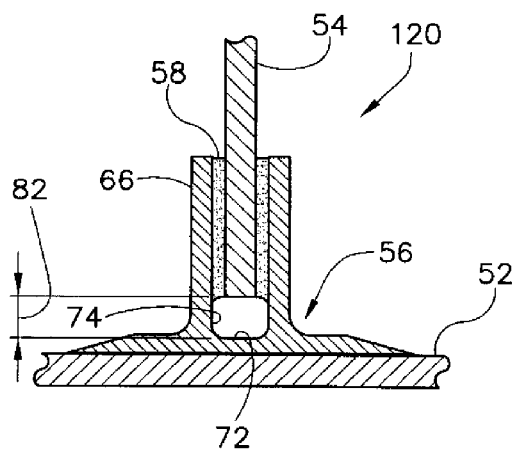

FIGS. 8A-8E show yet another embodiment for ensuring the cavity 74 of a joint 120 remains substantially free of adhesive 58 by using a core 122 that is an inflatable tube. The inflatable tube core 122 changes shape when inflated/deflated. Although the inflatable tube core 122 may be made of other materials without departing from the scope of the present invention, in one embodiment the inflatable tube core is made of latex rubber. The inflatable tube core 122, in a deflated state, is positioned in the cavity 74 before the adhesive 58 and the second structure 54 are placed in the slot 68, as shown in FIG. 8A. Once positioned in the cavity 74, the inflatable tube core 122 is inflated to substantially fill the cavity, as shown in FIG. 8B. Next, the adhesive 58 and second structure 54 are positioned in the slot 68 so the second structure is spaced from the bottom 72 of the slot 68 by the predetermined distance 82, as shown in FIG. 8C. In one embodiment, the second structure 54 is positioned in the slot 68 before the inflatable tube core 122 is inflated. The inflatable tube core 122 keeps adhesive 58 from entering the cavity 74. In one embodiment, the adhesive 58 fills substantially all of the slot 68 not occupied by the second structure 54 except the cavity 74. The presence of the predetermined distance 82 between the second structure 54 and the bottom 72 of the slot 68 can be ensured in a variety of ways, such as those already described. For example, in one embodiment, the presence of the predetermined distance 82 is ensured by lowering the second structure 54 into the desired place using a precision placement machine 96 (shown in FIGS. 5E, 6C, and 6D). In another embodiment, the presence of the predetermined distance 82 is ensured by inserting a fastener through index holes in the joint element and second structure, respectively (e.g., see FIG. 5D). After the second structure 54 is positioned in the slot 68 as desired and the adhesive 58 has cured sufficiently to hold the second member in place without support from the inflatable tube core 122, the tube core can be deflated and removed, as shown in FIGS. 8C-8E.

Figure 9:
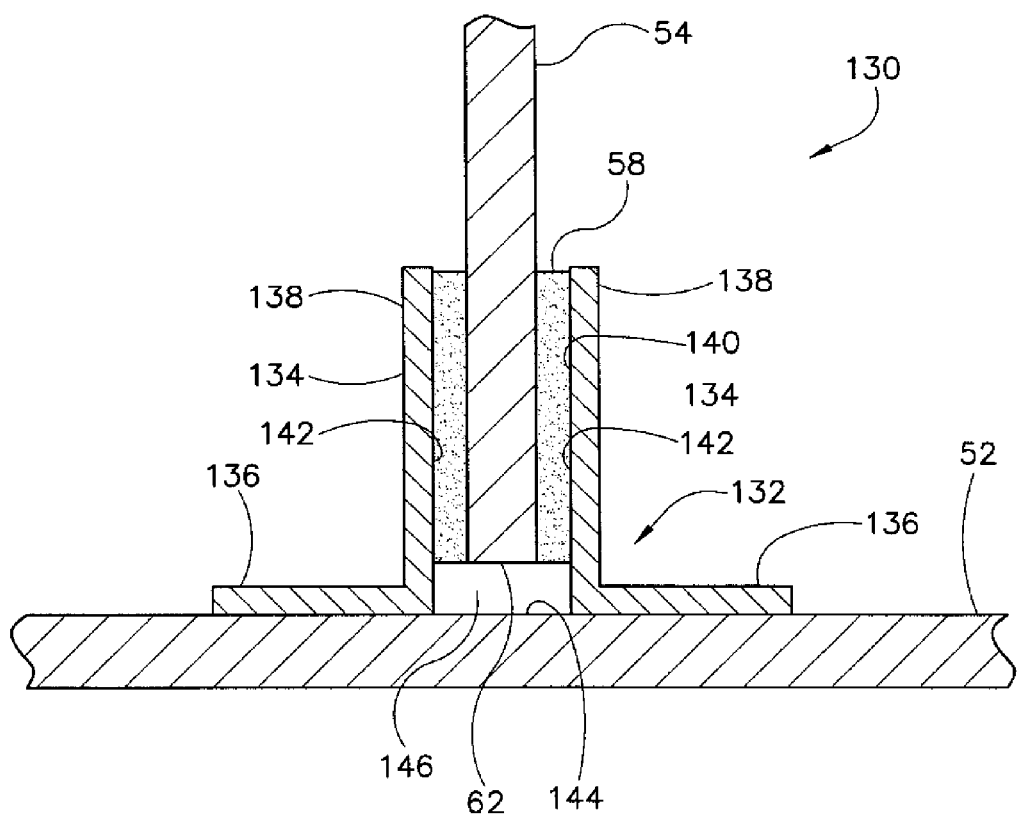
FIG. 9 is a cross-sectional elevation of a fourth embodiment of an adhesively bonded joint according to the present invention.

Although the joints 50, 102, 110, 120 shown in FIGS. 4-8 use a double lap joint as the joint element 56, 86, other types of joint elements having legs defining a slot may be used without departing from the scope of the present invention. For example, in one embodiment a joint 130 includes a joint element 132 comprising two L-brackets 134, as shown in FIG. 9. Each L-bracket 134 has a foot 136 and a leg 138 extending from the foot 136. The L-brackets 134 are attached to the first structure 52 adjacent each other to form the joint element 132. In this embodiment, the base of the joint element 132 is formed by the feet 136 of the L-brackets 134 (i.e., the base of the joint is effectively split and comprises the feet). The legs 138 of the L-brackets 134 define a slot 140 having opposing sides 142 and a bottom 144. The sides 142 of the slot 140, the bottom 144 of the slot, the adhesive 58, and the lower surface 62 of the second structure 54 define a cavity 146 that is substantially free of adhesive 58.

Eliminating the adhesive 58 from the cavity 74, 146 of the joint 50, 102, 110, 120, 130 according to the present invention does not reduce joint strength because the joint is nearly unloaded in the cavity area. That is, the adhesive 58 formed between the second structure 54, 84 and the legs 66, 138 of the joint element 56, 86, 132 accommodates substantially all of the load experienced between the joint element and the second structure. Because adhesive 58 is not needed in the cavity 74, 146 of the joint 50, 102, 110, 120, 130, the cavity can be made or left empty or filled with a core 100, 112, 122 made of a material that will not expand/contract due to thermal cycling to degrees sufficient to cause spaces or cracks in the joint. Joints 50, 102, 110, 120, 130 formed according to the present invention have been found to have substantially no unwanted spaces or cracks formed in or adjacent the cavity 74, 146 under various manufacturing and testing conditions, including thermal cycling between about 220.degree. F. and about −65.degree. F.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A product of manufacture comprising:
   a first structure;
   a joint element attached to the first structure, the joint element having a base and at least two legs extending from the base, the legs defining a slot having opposing sides and a bottom;
   a second structure positioned in said slot;
   an adhesive disposed in said slot joining the second structure to the joint element;
   a cavity formed between the bottom of the slot and the second structure, said cavity being substantially free of adhesive; and
   a flexible tube positioned in said cavity.

2. A product as set forth in claim 1 wherein said joint element includes a double lap joint element.

3. A product as set forth in claim 1 wherein said joint element includes at least two L-brackets positioned adjacent each other to form said slot.

4. A product as set forth in claim 1 wherein the adhesive fills substantially all of the slot not occupied by the second structure except said cavity.

5. A product as set forth in claim 1 wherein the flexible tube is made of polysulfide.

6. An apparatus comprising:
   a first body;
   a joint coupled to the first body, the joint having a recess;
   a second body that is situated in the recess;
   an adhesive disposed in the recess joining the second body to the joint;
   a cavity defined between a bottom of the recess and the second body, the cavity being substantially free of adhesive; and
   an inflatable core positioned in the cavity.

7. The apparatus as set forth in claim 6 wherein the joint includes a double lap joint element.

8. The apparatus as set forth in claim 6 wherein the joint includes at least two L-brackets positioned adjacent each other to form the recess.

9. The apparatus as set forth in claim 6 wherein the adhesive fills substantially all of the recess not occupied by the second body except the cavity.

* * * * *